(12) United States Patent
Aoki

(10) Patent No.: US 11,124,227 B2
(45) Date of Patent: Sep. 21, 2021

(54) STEERING CONTROL DEVICE

(71) Applicant: DENSO CORPORATION, Kariya (JP)

(72) Inventor: Takashi Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 239 days.

(21) Appl. No.: 16/384,187

(22) Filed: Apr. 15, 2019

(65) Prior Publication Data

US 2019/0322311 A1 Oct. 24, 2019

(30) Foreign Application Priority Data

Apr. 19, 2018 (JP) ................ JP2018-80464

(51) Int. Cl.
*B62D 5/04* (2006.01)
*B62D 15/02* (2006.01)
*B62D 6/00* (2006.01)

(52) U.S. Cl.
CPC ........... *B62D 5/0463* (2013.01); *B62D 6/008* (2013.01); *B62D 15/025* (2013.01); *B62D 5/0466* (2013.01)

(58) Field of Classification Search
CPC .... B62D 5/0463; B62D 15/025; B62D 6/008; B62D 5/0466
See application file for complete search history.

(56) References Cited

U.S. PATENT DOCUMENTS

| | | | |
|---|---|---|---|
| 2013/0075191 A1* | 3/2013 | Iwase | B62D 5/0463 180/446 |
| 2017/0253266 A1 | 9/2017 | Minamiguchi et al. | |
| 2018/0022383 A1* | 1/2018 | Kunihiro | B62D 6/002 701/41 |
| 2018/0065660 A1 | 3/2018 | Aoki | |

FOREIGN PATENT DOCUMENTS

| | | |
|---|---|---|
| JP | 3741449 B2 | 2/2006 |
| JP | 2016-49803 A | 4/2016 |
| JP | 6036522 B2 | 11/2016 |
| JP | 6044440 B2 | 12/2016 |
| JP | 2018-39350 A | 3/2018 |

* cited by examiner

*Primary Examiner* — Marthe Y Marc-Coleman
(74) *Attorney, Agent, or Firm* — Maschoff Brennan

(57) ABSTRACT

A steering control device (ECU) comprises a base assist unit for generating a basic assist torque and a steering torque correction unit. The steering torque correction unit outputs a corrected steering torque, which is decreasingly corrected so that an absolute value becomes smaller than an absolute value of a steering torque when a viscous load is requested to be applied to a driver by decreasing the assist torque. The base assist unit includes a target steering torque calculation unit and a servo controller. The target steering torque calculation unit calculates the target steering torque based on a steering torque. The servo controller calculates the basic assist torque to cause the corrected steering torque to follow the target steering torque.

10 Claims, 10 Drawing Sheets

COMPARISON EXAMPLE

PRESENT EMBODIMENT

STEERING CONTROL DEVICE

CROSS REFERENCE TO RELATED APPLICATION

The present application is based on Japanese patent application No. 2018-80464 filed on Apr. 19, 2018, the whole contents of which are incorporated herein by reference.

FIELD

The present disclosure relates to a steering control device.

BACKGROUND

A conventional steering control device is provided with a mechanism which reduces impact shock generated upon hitting of mechanical components when a steering wheel is turned to its rotation limit position (referred to as an end).

For example, the steering control device decreasingly corrects an assist torque by limiting a motor driving current in accordance with a steering operation speed (steering speed) near the end. That is, an assist control unit of the steering control device determines the motor driving current in accordance with a vehicle speed and a steering torque. When the steering speed is higher than a predetermined value, a steering speed limit control unit calculates a current value in a direction to decrease the motor driving current determined by the assist control unit and outputs such a decreased current value as an output of the assist control unit.

SUMMARY

The present disclosure provides a steering control device, which generates a basic assist torque and a corrected steering torque. The corrected steering torque decreases so that an absolute value of the corrected steering torque becomes smaller than an absolute value of a steering torque detection value, when a viscous load is required to be applied to a driver by decreasing the assist torque. The basic assist torque is calculated based on a target steering torque calculated based on the steering torque. The basic assist torque is calculated to cause the corrected steering torque to follow the target steering torque.

DETAILED DESCRIPTION OF EMBODIMENT

A steering control device according to one embodiment will be described with reference to the drawings. An electronic control unit (ECU) provided as a steering control device is used for an electric power steering system of a vehicle to control a steering assist torque generated by a steering assist motor.

Configuration of Electric Power Steering System

Figure 1:
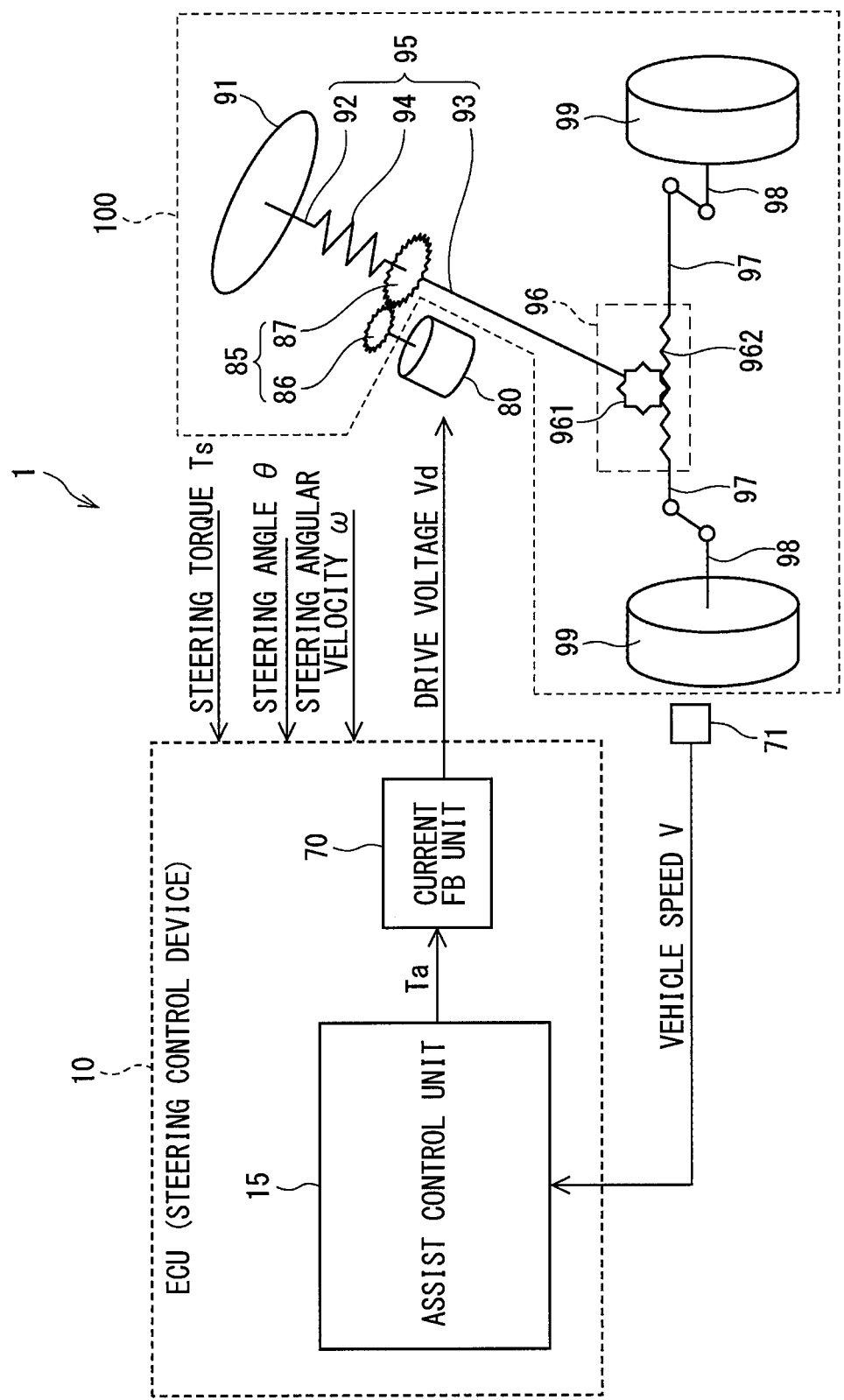
FIG. 1 is a schematic view of an electric power steering system.

As shown in FIG. 1, an electric power steering system 1 is configured to assist a driver's steering operation of a steering wheel 91 by a driving torque of a steering assist motor (hereinafter simply referred to as a motor) 80. The steering wheel 91 is fixed to one end of a steering shaft 92, and an intermediate shaft 93 is provided on the other end side of the steering shaft 92. The steering shaft 92 and the intermediate shaft 93 are coupled by a torsion bar of a torque sensor 94. These components form a steering shaft assembly 95. The torque sensor 94 is provided to detect a steering torque Ts based on a torsion angle of the torsion bar.

A gear box 96 including a pinion gear 961 and a rack 962 is provided at an end portion of the intermediate shaft 93 opposite to the torque sensor 94. When a driver rotates the steering wheel 91, the pinion gear 961 rotates together with the intermediate shaft 93, and the rack 962 moves to right and left with the rotation of the pinion gear 961. Tie rods 97 are provided at both lateral ends of the rack 962 and coupled to tires (road wheels) 99 via knuckle arms 98. The tie rods 97 reciprocate right and left to pull and push the knuckle arms 98 and change the direction of the tires 99.

The motor 80 is, for example, a three-phase AC brushless motor, which outputs an assist torque for assisting a steering force of the steering wheel 91 in accordance with a drive voltage Vd supplied through the ECU 10. In case of the three-phase AC motor, the drive voltage Vd means each phase voltage of U phase, V phase and W phase. Rotation of the motor 80 is transmitted to the intermediate shaft 93 via a speed reduction mechanism 85, which is formed of a worm gear 86, a worm wheel 87 and the like. In addition, steering rotation of the steering wheel 91 and rotation of the intermediate shaft 93 caused by a reaction force from a road surface are transmitted to the motor 80 via the speed reduction mechanism 85.

The electric power steering system 1 shown in FIG. 1 is a column-assisted type in which the rotation of the motor 80 is transmitted to the steering shaft 95. However, the ECU 10 of the present embodiment may be applied to an electric power steering system of a rack assist type or to a steer-by-wire system in which a steering wheel and tires are mechanically separated. In another embodiment, a multi-phase AC motor other than three phases or a DC motor with brushes may be used as the steering assist motor.

Here, the entire mechanism from the steering wheel 91 to the tires 99 to which the steering force of the steering wheel 91 is transmitted is referred to as a steering system mechanism 100. The ECU 10 is provided to control a steering torque Ts generated by the steering system mechanism 100 by controlling a driving torque which the motor 80 outputs to the steering system mechanism 100. The ECU 10 is configured to acquire the steering torque Ts, a steering angle θ and a steering angular velocity ω from the steering system mechanism 100. Further, the ECU 10 is configured to acquire a vehicle speed V detected by a vehicle speed sensor 71 provided at a predetermined part of the vehicle.

The ECU 10 includes an assist control unit 15 and a current feedback unit 70, and operates with power from an in-vehicle battery (not shown). The assist control unit 15 calculates an assist torque Ta for assisting a steering operation of the driver. The current feedback unit 70 calculates the drive voltage Vd to be applied to the motor 80 by feedback-controlling an actual current flowing through the motor 80 to a target current determined in accordance with the assist torque Ta. The ECU 10 is configured to cause the steering system mechanism 100, which is a control object to be controlled, to generate the steering torque Ts by applying the drive voltage Vd to the motor 80.

Various processing in the ECU 50 may be software processing executed by a microcomputer, which has a CPU for executing a predetermined control program and a tangible memory device such as a ROM storing the predetermined control program. The processing in the ECU 50 may alternatively be hardware processing executed by discrete electronic circuits.

Configuration of ECU as Steering Control Device

Embodiment

Figure 2:
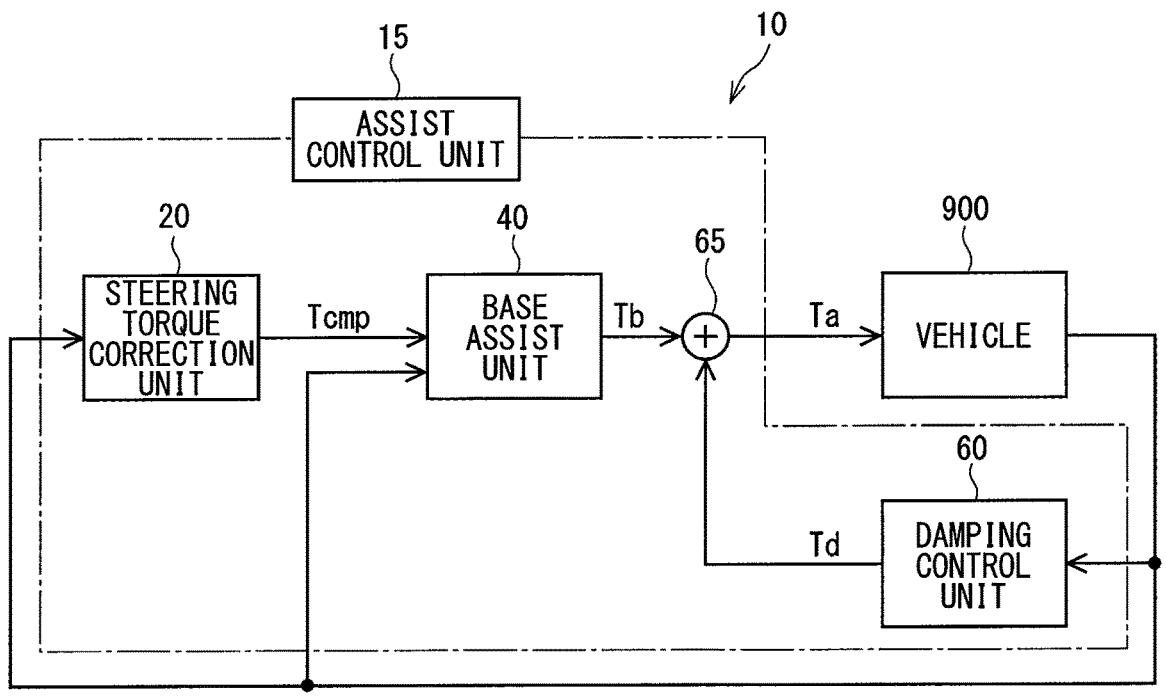
FIG. 2 is a block diagram of a steering device in one embodiment.

Next, the ECU 10 according to one embodiment will be described in order from the overall configuration to the detailed configuration with reference to FIG. 2 to FIG. 6. For the well-known general configuration in the steering control device, illustration and explanation are omitted as appropriate. FIG. 2 shows the overall configuration of the ECU 10. The current feedback unit 70 of the ECU 10 is omitted. The motor 80 and the steering system mechanism 100 described above is provided in a vehicle 900. In FIG. 2, input and output information having no specific identification is some information such as torque, angle, angular velocity, vehicle speed, etc. In some cases, plural pieces of information are included in one arrow signal line.

The assist control unit 15 includes a steering torque correction unit 20, a base assist unit 40, a damping control unit 60 and an adder 65, and is configured to output the assist torque Ta to the vehicle 900. Any information from the vehicle 900 is input to the steering torque correction unit 20, the base assist unit 40 and the damping control unit 60. The steering torque correction unit 20 is configured to calculate a corrected steering torque Tcmp and output it to the base assist unit 40. The base assist unit 40 is configured to generate a basic assist torque Tb. The damping control unit 60 is configured to calculate a damping torque Td. The basic assist torque Tb and the damping torque Td are added by the adder 65 and outputted as the assist torque Ta.

Figure 3:
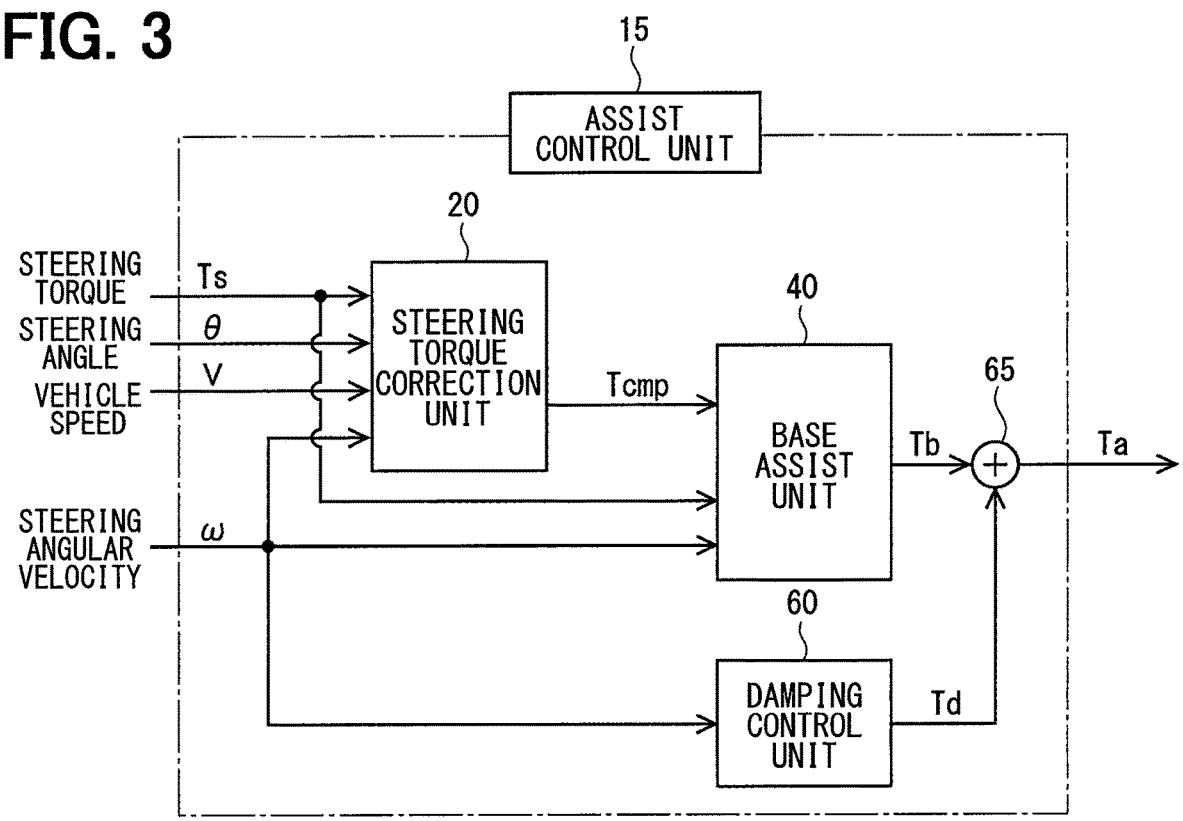
FIG. 3 is a block diagram of an assist control unit of the steering device in one embodiment.

FIG. 3 shows more detailed overall configuration example of the assist control unit 15. The steering torque correction unit 20 is configured to decreasingly correct, that is, decrease, a detection value of the steering torque Ts so that the assist torque Ta and the steering angular velocity ω at the time of end hitting is reduced and an impact load applied to the intermediate shaft 93 is reduced. The steering torque Ts, the steering angle θ, the vehicle speed V and the steering angular velocity ω are inputted to the steering torque correction unit 20.

The base assist unit 40 is configured to calculate the base assist torque Tb by determining a target steering torque Ts*, which provides the driver with a proper feeling such as heavy/light, responsive/non-responsive or viscous/non-viscous during the steering operation when the driver operates the steering wheel 91. The steering torque Ts, the steering angular velocity ω and the corrected steering torque Tcmp calculated by the steering torque correction unit 20 are inputted to the base assist unit 40.

The damping control unit 60 is configured to perform damping control to achieve a desired vehicle motion characteristic by correcting to suppress the assist torque Ta as one type of vehicle motion control related to the sprung motion. The steering angular velocity ω is inputted to the damping control unit 60. The damping control provides an effect of suppressing the assist torque Ta even when the driver does not touch the steering wheel 91.

The steering angle θ, the steering angular velocity ω and the steering torque Ts have respective signs defined as follows. The sign of the steering angle θ is defined based on the present position of the steering wheel 91 relative to the neutral position. For example, the steering angle θ on the left side with respect to the neutral position is positive (+), and the steering angle θ on the right side with respect to the neutral position is defined as negative (−). The sign of the steering angular velocity ω is defined based on the rotation direction corresponding to the sign of the steering angle θ. That is, when the sign of the steering angle θ is defined as described above, the steering angular velocity ω in the counter-clockwise rotation direction is defined as positive and the steering angular velocity ω in the clockwise rotation direction is defined as negative.

The sign of the steering torque Ts is defined in the same way as the sign of the steering angular velocity ω. Here, the sign of the steering torque Ts represents the direction in which the torque is actually applied to the steering wheel 91 regardless of whether the steering wheel 91 actually rotates in that direction. For example, due to road surface load, inertia torque or the like, the steering wheel 91 may be stopped or rotating in the direction opposite to the steering torque Ts even if the steering torque Ts is applied.

In another embodiment, contrary to the above definition, the right-side steering angle θ, the steering speed w in the clockwise rotation direction and the steering torque Ts in the clockwise rotation direction relative to the neutral position may be defined as positive, and the left-side steering angle θ, the steering speed w in the counter-clockwise rotation direction and the steering torque Ts in the counter-clockwise rotation direction may be defined as negative.

Hereinafter, an upper limit value of an absolute value of the steering angle θ, that is, the rotation limit position of the steering wheel 91 is referred to as an end. The end corresponds, for example, to a position where the end of the rack 962 mechanically hits a certain component. In addition, movement of the steering wheel 91 in a direction from the neutral position toward the end is referred to as a turn-in, and movement of the steering wheel 91 in a rotation direction from the end toward the neutral position is referred to as a turn-back. States of the turn-in and the turn-back may be determined by the signs of the steering angle θ, the steering angular velocity ω and the steering torque Ts.

For example, it is determined to be in the turn-in state when the steering angle θ and the steering angular velocity ω have the same sign, and it is determined to be in the turn-back state when the steering angle θ and the steering angular velocity ω have different signs. Similarly, it is possible to determine the turn-in and turn-back states by using a combination of the steering angle θ and the steering torque Ts, a combination of the steering angular velocity ω and the steering torque Ts and a combination of the steering angle θ, the steering angular velocity ω and the steering torque Ts.

It is proposed conventionally as a technique for reducing the end shock impact and protecting the end by adding the damping torque to the basic assist torque near the end position. When the assist control is operating with a high assist ratio such as the end hitting time, the damping torque is canceled and a large viscous load cannot be applied to the driver. Here, the viscous load is defined to be an increment of a detection value of the steering torque Ts, which increases in accordance with the steering angular velocity ω, out of an increment of a detected value of the steering torque Ts applied by the driver.

Therefore, the assist control unit 15 of the present embodiment is configured to appropriately increase the viscous load, which the driver feels, in case that the steering torque generated by the driver is requested to be increased at the time of the end hitting, for example. As a configuration for this purpose, the steering torque correction unit 20 is provided.

Figure 4:
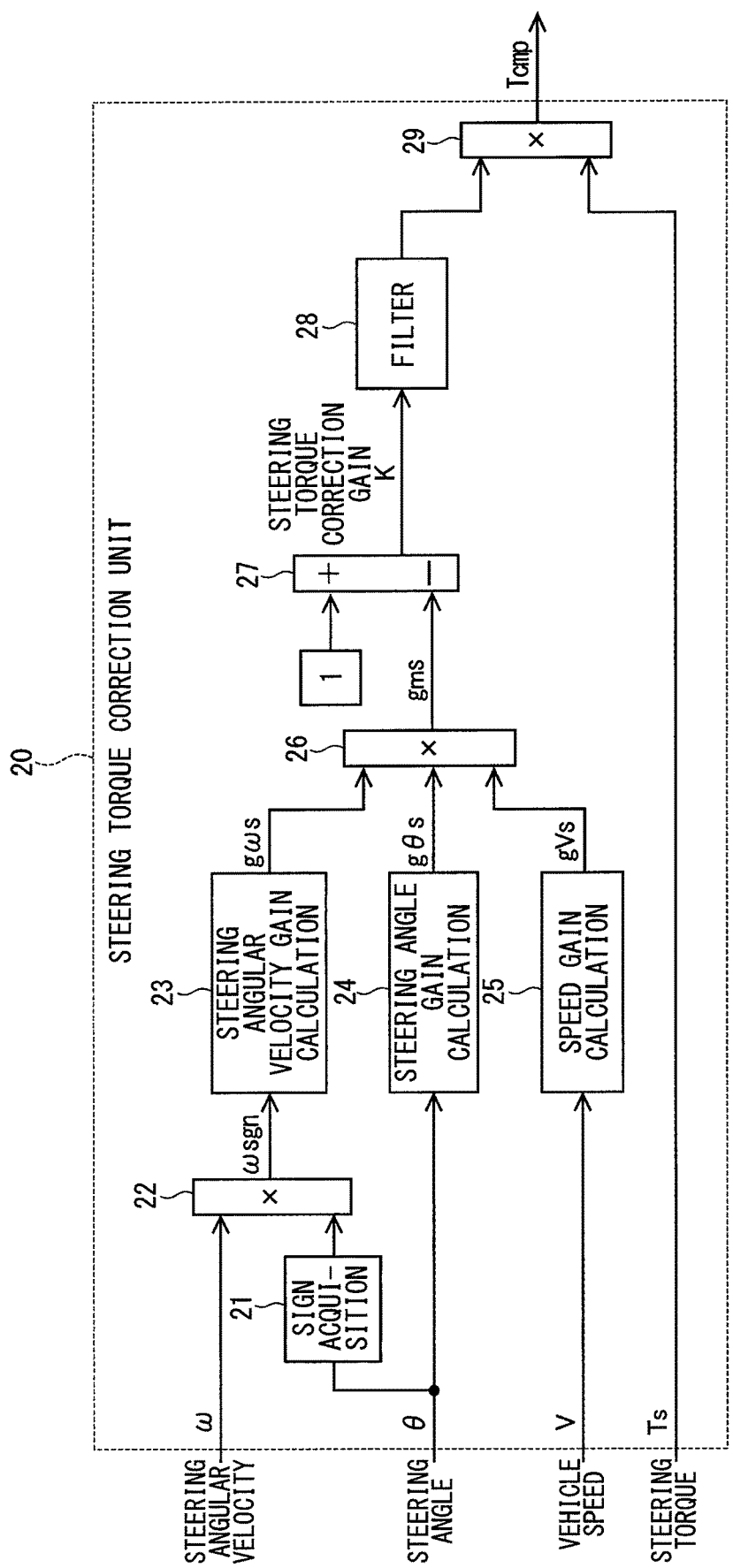
FIG. 4 is a block diagram of a steering torque correction unit.

FIG. 4 shows a configuration example of the steering torque correction unit 20. The steering torque correction unit 20 includes a steering angular velocity gain calculation unit 23, a steering angle gain calculation unit 24 and a vehicle speed gain calculation unit 25 for correction of the detection value of the steering torque Ts. The steering angular velocity gain calculation unit 23 is configured to calculate a steering angular velocity gain gωs which changes in accordance with the steering angular velocity ω. The steering angle gain calculation unit 24 is configured to calculate a steering angle gain gθs which changes in accordance with the steering angle θ. The vehicle speed gain calculation unit 25 is configured to calculate a vehicle speed gain gVs that changes in accordance with the vehicle speed V.

The steering angular velocity ω is multiplied by a sign of the steering angle θ acquired by a sign acquisition unit 21 in a sign multiplier 22. Then, a sign-multiplied steering angular velocity ωsgn is inputted to the steering angular velocity gain calculation unit 23. When the steering angle θ and the steering angular velocity ω have the same sign and the sign-multiplied steering angular velocity ωsgn is positive, it indicates that the steering wheel 91 is in the turn-in state in which the steering wheel 91 is being rotated toward the end. On the other hand, when the steering angle θ and the steering angular velocity ω have different signs and the sign-multiplied steering angular velocity ωsgn is negative, it indicates that the steering wheel 91 is in the turn-back state in which the steering wheel 91 is being rotated toward the neutral position.

As described above, the steering torque correction unit 20 checks whether the steering wheel 91 is in the turn-in state or the turn-back state, that is, whether there is a possibility of collision with the end by using the sign-multiplied steering angular velocity ωsgn. Then, in case of the turn-in state having a possibility of hitting the end, the steering torque correction unit 20 outputs the corrected steering torque Tcmp calculated by decreasingly correcting the absolute value of the detected value of the steering torque Ts as described below and suppresses the impact at the end hitting. On the other hand, in case of the turn-back state where there is no possibility of the end hitting, the steering torque correction unit 20 outputs the detected value of the steering torque Ts as it is without decreasing correction. Therefore, it is avoided to increase the steering torque Ts unnecessarily at the time of turning back the steering wheel 91.

The steering angular velocity gain gωs, the steering angle gain Os and the vehicle speed gain gVs are set in a range from 0 to 1. These gains are set to 0 when the steering torque Ts is not corrected decreasingly, and to a value which is larger than 0 and smaller than 1 depending on the decrease amount when the steering torque Ts is decreasingly corrected. A product gain calculator 26 multiplies the steering angular velocity gain gωs, the steering angle gain Os and the vehicle speed gain gVs to calculate a product gain gms.

A gain subtractor 27 calculates a steering torque correction gain K by subtracting the product gain gms from 1. A filter 28 removes high frequency components of the steering torque correction gain K by filter processing. A correction gain multiplier 29 calculates the corrected steering torque Tcmp by multiplying the steering torque Ts by the filtered steering torque correction gain K. That is, as the product gain gms increases, the steering torque correction gain K decreases. As a result, the corrected steering torque Tcmp decreases. When there is a request to reduce the assist torque to apply the viscous load to the driver, the steering torque correction gain K is set to a value less than 1.

Figure 5A:
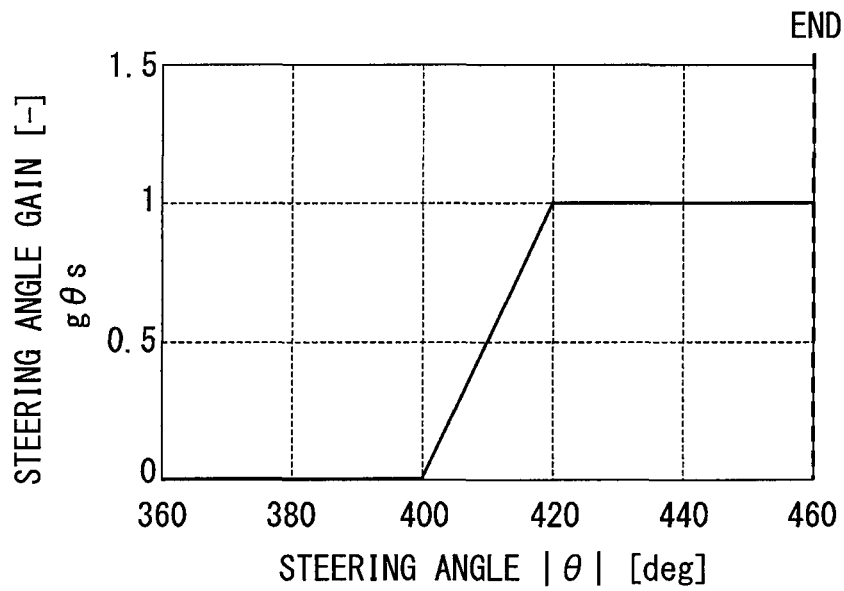
FIG. 5A is an example of a steering angle gain map and FIG. 5B is an example of a steering angular velocity gain map.
Figure 5B:
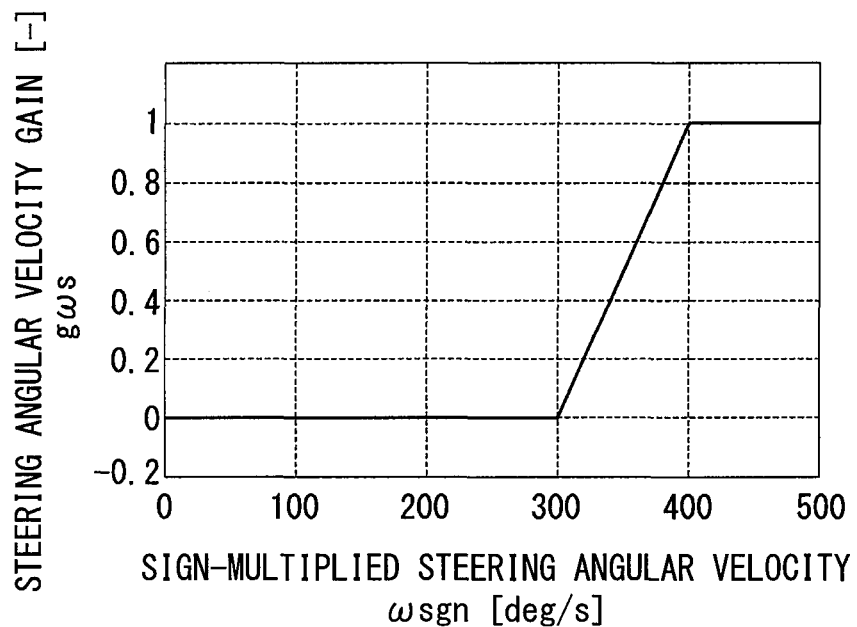

FIG. 5A and FIG. 5B show examples of data maps of the steering angle gain gθs relative to the absolute value of the steering angle θ and the steering angular velocity gain gωs relative to the sign-multiplied steering angular velocity ωsgn, respectively. In the example of FIG. 5A, the position where the steering angle θ is ±460 degrees is the end and ±400 degrees is an angle threshold value. The steering angle gain Os is 0 when the absolute value of the steering angle θ is 400 degrees or smaller, increases from 0 to 1 in a range from 400 degrees to 420 degrees approaching the end, and 1 at or larger than 420 degrees. Therefore, when the absolute value of the steering angle θ approaches the end and exceeds the angle threshold value, the steering torque correction unit 20 decreases the absolute value of the corrected steering torque Tcmp.

In the example of FIG. 5B, the steering angular velocity gain gωs is 0 when the sign-multiplied steering angular velocity ωsgn is 300 or smaller degrees/second, increases from 0 to 1 in a range from 300 to 400 degrees/second, and 1 at 400 or larger degrees/second. No example of the map of the vehicle speed gain gVs is shown. However, the steering wheel 91 is rarely rotated closely to the end in high speed travel and the steering operation is not suppressed preferably at the time of rapid steering in emergency. Therefore, the vehicle speed gain gVs is set to increase as the vehicle speed V is low and decrease as the vehicle speed V increases. The steering torque correction unit 20 calculates the corrected steering torque Tcmp in accordance with the vehicle speed V.

With such data maps exemplified above, the steering torque correction unit 20 decreases the absolute value of the corrected steering torque Tcmp as the absolute value of the steering angle θ approaches the end or the absolute value of the steering angular velocity ω toward the end increases. That is, the corrected steering torque Tcmp is corrected to decrease so that its absolute value becomes smaller than the absolute value of the detected value of the steering torque Ts. In normal steering, the sign of the corrected steering torque Tcmp coincides with the detected value of the steering torque Ts. However, when the steering wheel 91 is turned by input force from the road surface as described above, the end hitting is realized so that the signs of the rotation direction and the steering torque Ts do not coincide with each other.

Figure 6:
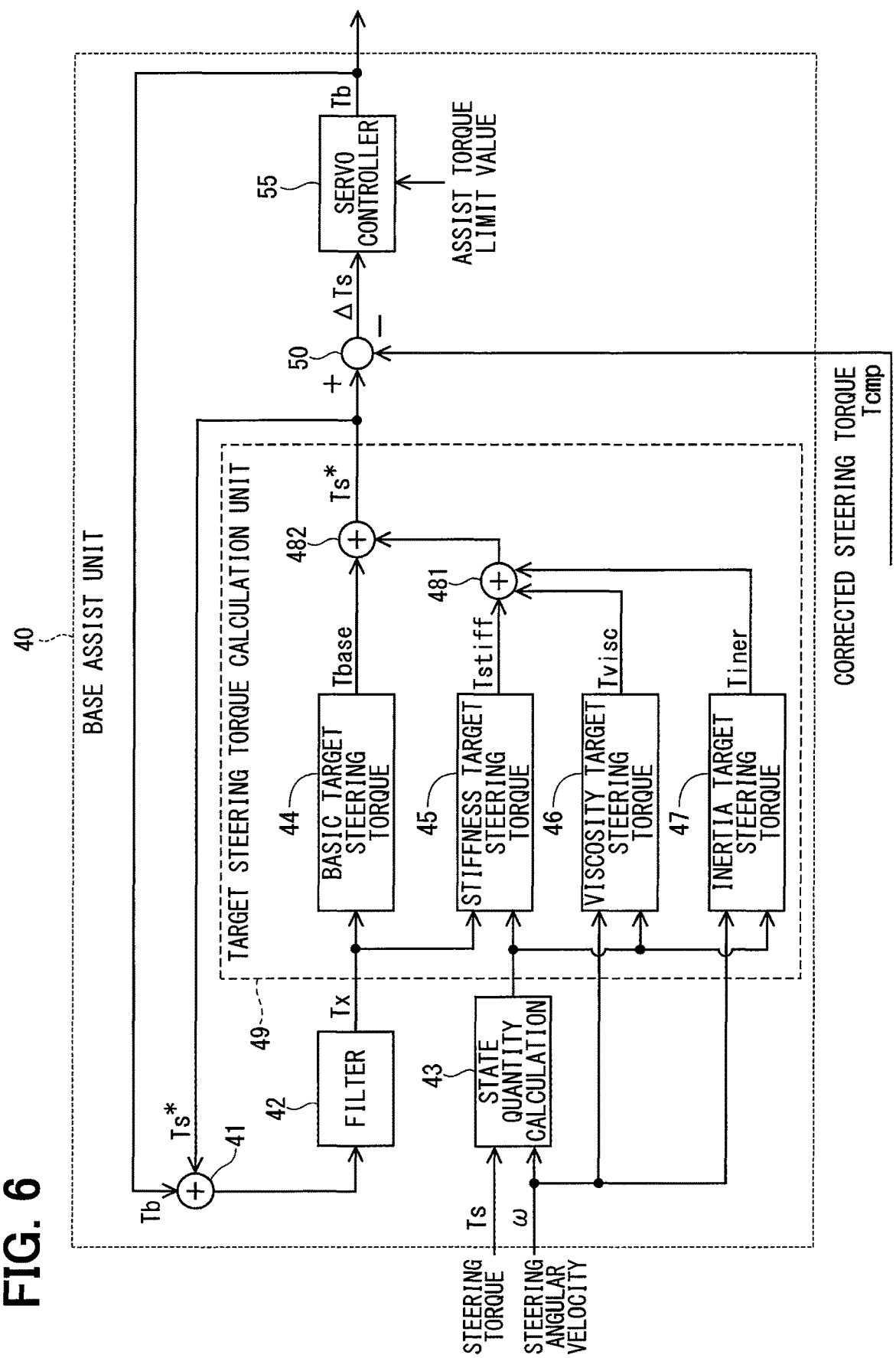
FIG. 6 is a block diagram of a base assist unit.

FIG. 6 shows a configuration example of the base assist unit 40 shown in FIG. 2 and FIG. 3. The base assist unit 40 includes an input adder 41, a filter 42, a state quantity calculation unit 43, a target steering torque calculation unit 49, a torque deviation calculation unit 50, and a servo controller 55. The target steering torque calculation unit 49 calculates the target steering torque Ts* based on at least the steering torque Ts and the steering angular velocity ω. The torque deviation calculation unit 50 calculates a torque deviation ΔTs by subtracting the corrected steering torque Tcmp from the target steering torque Ts*. The servo controller 55 calculates the basic assist torque Tb to cause the corrected steering torque Tcmp to follow the target steering torque Ts*, that is, so that the torque deviation ΔTs is reduced toward 0.

The target steering torque calculation unit 49 includes a basic target steering torque calculation unit 44, a stiffness target steering torque calculation unit 45, a viscosity target steering torque calculation unit 46, an inertia target steering torque calculation unit 47, an adjusted component summation unit 481 and a total target steering torque calculation unit 482. The input adder 41, the filter 42, and the state quantity calculation unit 43 may be included in the target steering torque calculation unit 49.

The input adder 41 adds the basic assist torque Tb and the target steering torque Ts*. In another embodiment, the basic assist torque Tb and the steering torque Ts may be added. The filter 42 extracts a component of a band having a predetermined frequency, for example, 10 Hz or lower from the added torque, and outputs it as an estimated load Tx. The basic target steering torque calculation unit 44 calculates the basic target steering torque Tbase based on the estimated load Tx.

Here, the estimated load Tx is derived from the basic assist torque Tb and the target steering torque Ts*. Further, the basic assist torque Tb reflects the corrected steering torque Tcmp inputted to the servo controller 55. Thus, the basic target steering torque calculation unit 44 comprehensively calculates the basic target steering torque Tbase based on the steering torque.

The state quantity calculation unit 43 calculates a state quantity indicating whether it is in the turn-in state or the turn-back state based on the steering torque Ts and the steering angular velocity ω. The stiffness target steering torque calculation unit 45 calculates a stiffness target steering torque Tstiff based on the estimated load Tx and the state quantity. The viscosity target steering torque calculation unit 46 calculates a viscosity target steering torque Tvisc based on the steering angular velocity ω and the state quantity. The inertia target steering torque calculation unit 47 calculates an inertia target steering torque Tiner based on the steering angular velocity ω and the state quantity.

The stiffness target steering torque Tstiff, the viscosity target steering torque Tvisc and the inertia target steering torque Tiner are adjustment components for adjusting the stiffness, viscous feeling and inertia feeling of the steering system mechanism 100 to be applied to the driver at the time of steering, respectively. In the present embodiment, attention is paid to the viscosity target steering torque Tvisc which applies viscous feeling to the driver in particular. As the steering torque Ts applied by the driver increases in accordance with the steering angular velocity ω, the driver feels the viscous feeling more easily. A damping torque Td has an effect of reducing the assist torque Ta even when the driver does not touch the steering wheel 91. However, the viscosity target steering torque Tvisc applies a viscous feeling when the driver is operating the steering wheel 91.

The adjustment component summation unit 481 sums up the three adjustment components Tstiff, Tvisc and Tiner. The total target steering torque calculation unit 482 calculates a total target steering torque as the target steering torque Ts* by adding the torque value of the adjustment component outputted from the adjustment component summation unit 481 to the basic target steering torque Tbase.

The present embodiment configured as described above thus provides the following effects <1> and <2>.

<1> A stable viscous load can be applied to a driver regardless of an assist magnification ratio.

<2> It is possible to apply a large viscous load to a driver without setting it to a high gain.

Figure 9:
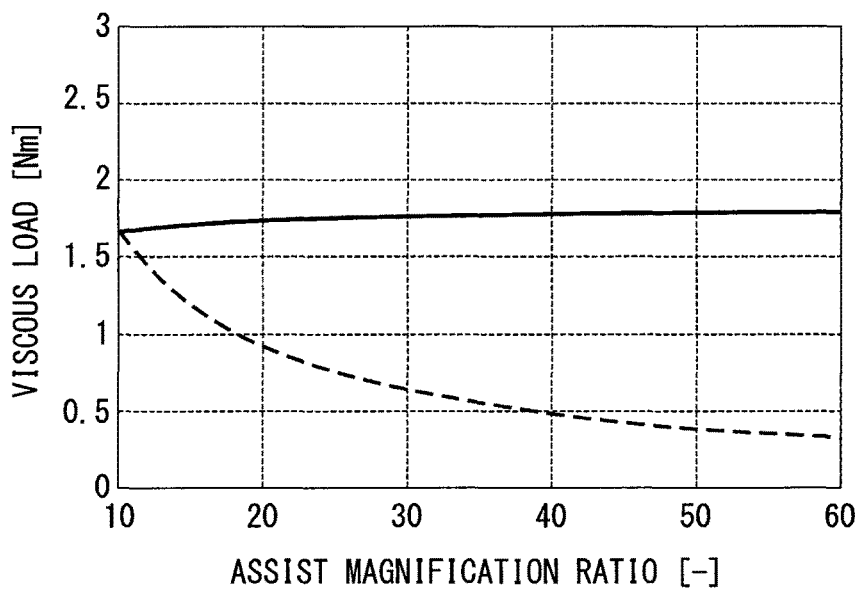
FIG. 9 is a characteristic chart showing a relation between an assist magnification ratio and a viscous load.

The present embodiment, which has the servo control structure for the assist control, provides the above-described effects <1> and <2> relative to a comparison example shown in FIG. 7 having no servo control structure in the assist control for the following reasons described below with reference to FIG. 7 to FIG. 9.

Figure 7:
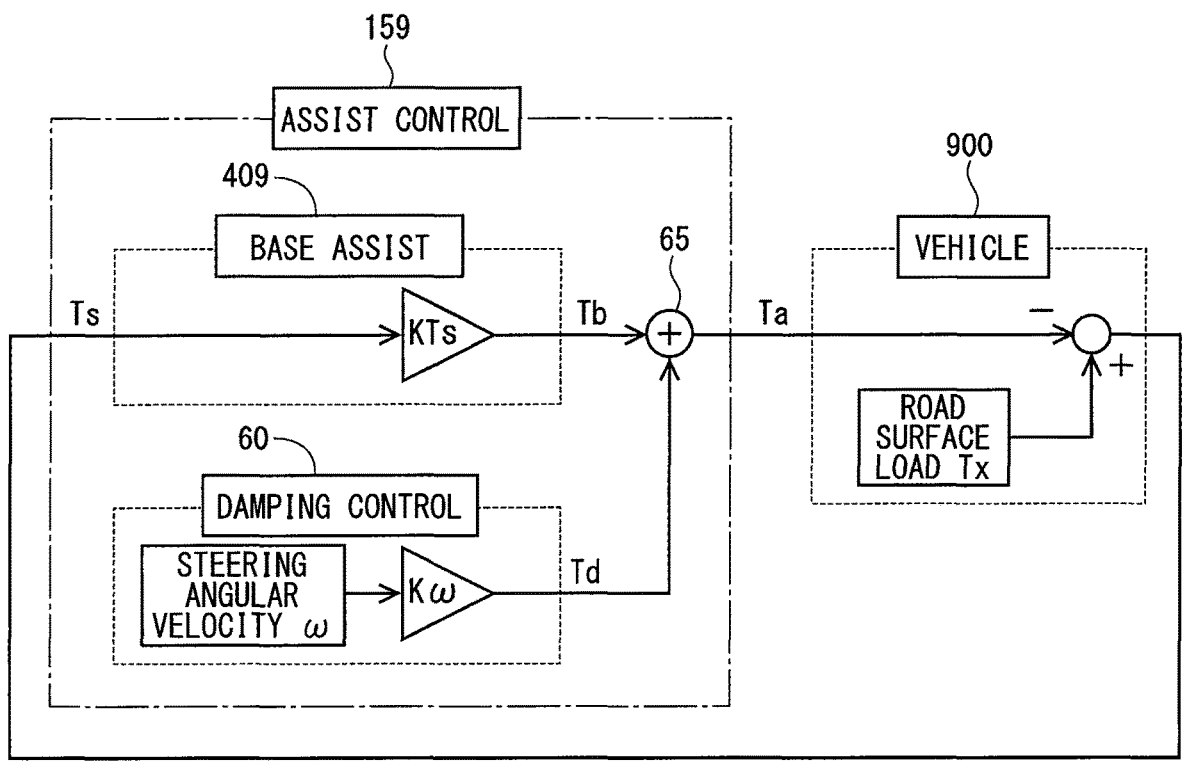
FIG. 7 is a model diagram of an assist control unit of a comparison example, which includes no servo control mechanism.

FIG. 7 shows a simplified model of a configuration of an assist control unit 159 of the comparison example. The steering torque Ts corresponding to a deviation between a road surface load Tx and an assist torque Ta is directly inputted to a base assist unit 409. The base assist unit 409 multiplies the steering torque Ts by an assist magnification ratio KTs to generate a basic assist torque Tb. The damping control unit 60 multiplies a steering angular velocity ω by a damping gain Kw and a calculated damping torque Td is added to the basic assist torque Tb to calculate the assist torque Ta. In the assist control model of this comparative example, the steering torque Ts is expressed by the following equation [Eq.1].

$$Ts = [1/(1+KTs)](Tx-Td) \qquad [Eq. 1]$$

The equation [Eq. 1] includes the assist magnification ratio KTs in the denominator of a coefficient of the damping torque Td. Therefore, as the assist magnification ratio KTs increases, the viscous load due to the damping torque Td decreases. A relationship between the assist magnification ratio KTs and the viscous load due to the damping torque Td in the comparative example is shown by a broken line in FIG. 9.

Figure 8:
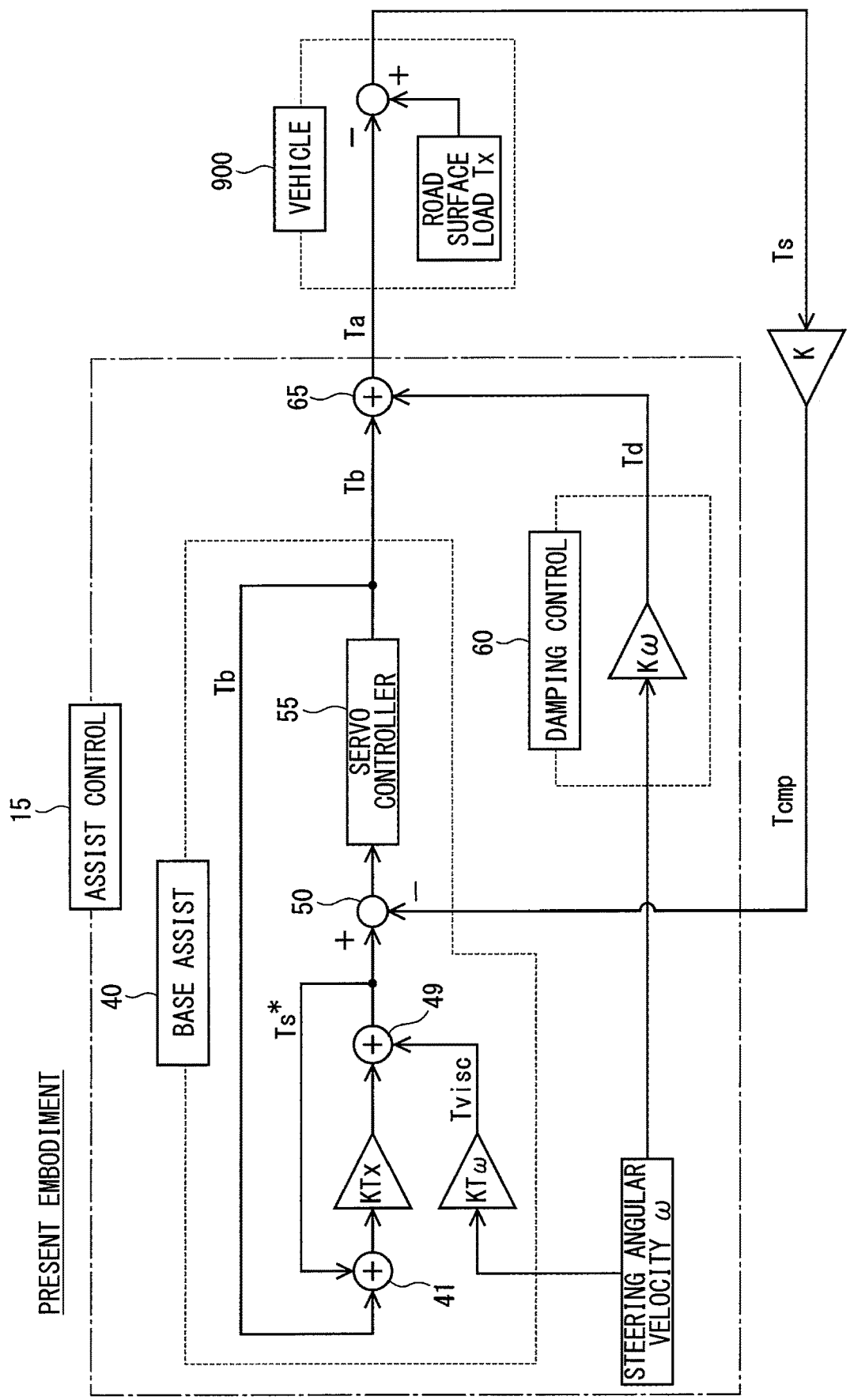
FIG. 8 is a model diagram of an assist control unit, which includes a servo control mechanism in one embodiment.

Next, FIG. 8 shows a simplified model of a configuration of the assist control unit 15, which has the servo control structure according to the present embodiment. The corrected steering torque Tcmp which is decreasingly corrected by multiplying the steering torque Ts by the gain K(0<K≤1) is fed back to the target steering torque Ts* of the base assist unit 40. The servo controller 55 calculates the basic assist torque Tb to cause the corrected steering torque Tcmp to follow the target steering torque Ts*.

The basic target steering torque Tbase is calculated by multiplying the sum of the target steering torque Ts* and the basic assist torque Tb by a basic gain KTx. The viscosity target steering torque Tvisc is calculated by multiplying the steering angular velocity ω by the viscosity gain KTω. The target steering torque Ts* is calculated by adding the basic target steering torque Tbase and the viscosity target steering torque Tvisc. In the assist control model of the present embodiment, the steering torque Ts is expressed by the following equation [Eq. 2].

$$Ts = (KTx/G)(Tx-Td) + (1/G)Tvisc$$

$$G = KTx + (1-KTx)K \qquad [Eq. 2]$$

The viscosity target steering torque Tvisc of the second term in the equation of the steering torque Ts is hardly influenced by the basic gain KTx, which corresponds to the assist magnification ratio of the servo controller 55. A relationship between the assist magnification ratio KTx and the viscous load due to the viscosity target steering torque Tvisc in the present embodiment is shown by a solid line in FIG. 9. In this manner, the assist control unit 15 having the servo control structure of the present embodiment achieves the above-described effect <1>, that is, the viscous load can be generated stably with the high assist magnification ratio.

The present embodiment provides the effect <2>, that is, a large viscous load can be applied to the driver without high gain. The equation [Eq. 2] is introduced again as the equation [Eq. 3], in which K and Tvisc/G are underlined for attention.

$$G = KTx + (1-KTx)K$$

$$Ts = (KTx/G)(Tx-Td) + \underline{(1/G)}Tvisc \quad [\text{Eq. 3}]$$

It is to be understood that, as the gain K (0<K≤1) which is multiplied to the steering torque Ts decreases in the equation [Eq. 3] of the gain G, the second term Tvisc/G of the equation of the steering torque Ts increases. That is, it is possible to stably generate a large viscous load by decreasing the gain K without increasing the viscosity gain KTω and the damping gain Kω.

On the other hand, if the viscosity target steering torque Tvisc or the damping torque Td is increased to provide a large viscous load, it is necessary to increase the viscous gain KTω or the damping gain Kω, which is multiplied to the steering angular velocity ω, that is, set a high gain. Therefore, the stability of a feedback loop of the steering angular velocity ω must be reduced. In case of control for changing the characteristics suddenly as in shock reduction control at the time of end hitting, the range of adaptation is widened as the stability is higher and better steering feeling can be realized. Therefore, as described above, it is preferable to increase the viscous load while securing the stability of the feedback loop by decreasing the decrease correction gain K of the steering torque Ts at the time of end hitting.

Supplemental Description about Configuration of Present Embodiment

As described above, according to the present embodiment, the viscous load is generated stably with the high assist magnification ratio at the time of end hitting by using the corrected steering torque Tcmp, which is determined by multiplying the steering torque Ts by the correction gain, as the actual torque the deviation of which relative to the target steering torque Ts* is inputted to the servo controller 55. Such a configuration is adopted for the following reasons described below with reference to FIG. 10 to FIG. 12C and using mathematical equations. In FIG. 10 to FIG. 12C, names and symbols referred to in these figures are changed from those of FIG. 8. A plant (vehicle) 900 is the same as the vehicle 900 shown in FIG. 8. A correction torque Tc and a road surface load TL correspond to the damping torque Td and the road surface load Tx shown in FIG. 8.

Figure 10:
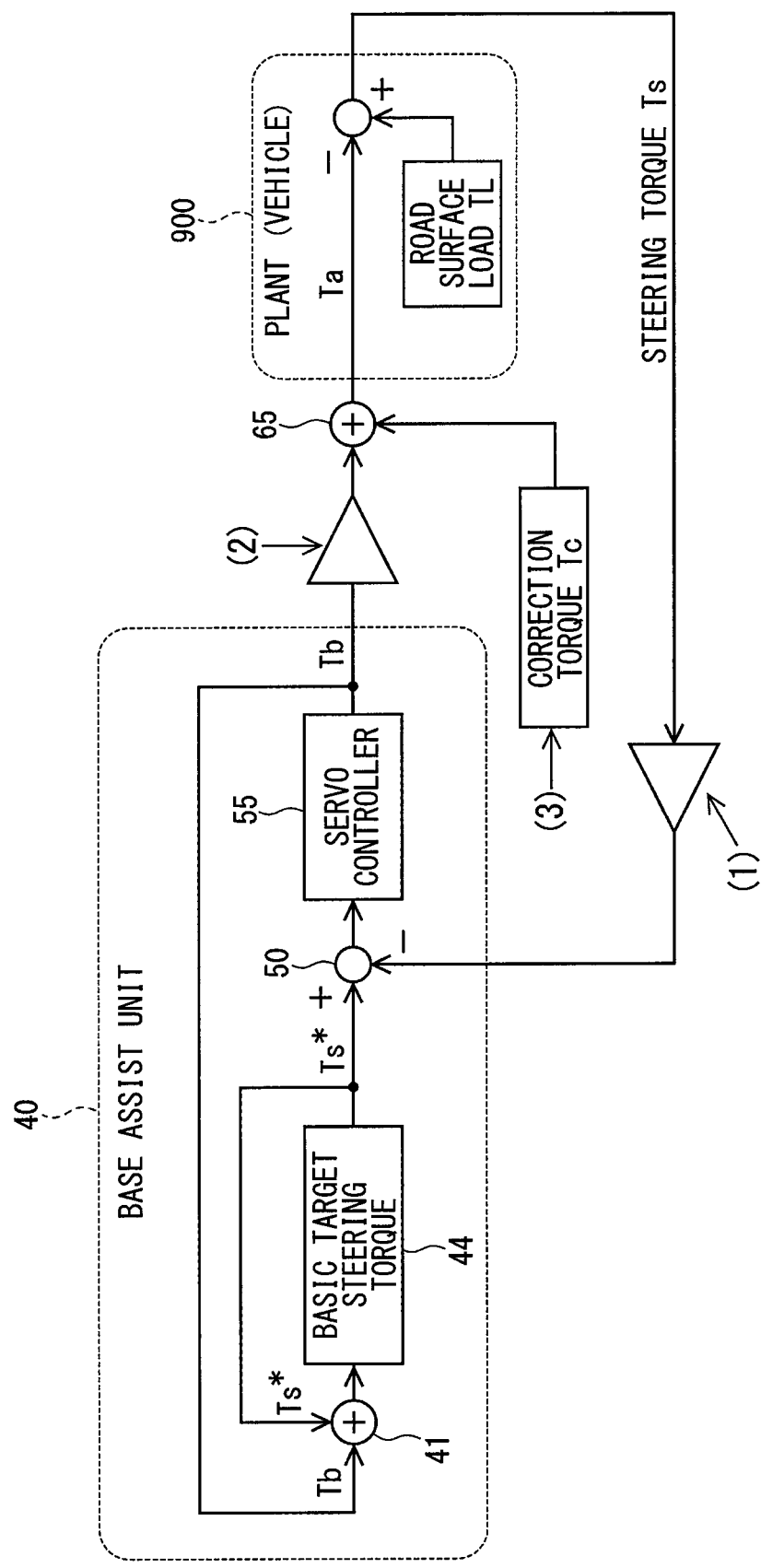
FIG. 10 is a simplified block diagram of a base assist unit which includes a servo control mechanism.

FIG. 10 shows a simplified configuration of the base assist unit 40 having the servo control structure. Three configuration candidates (1), (2) and (3) are assumed as configurations for decreasing the final assist torque Ta and increasing the steering torque Ts applied by the driver. As a result of the following analysis, the configuration candidate (1) is preferred for adoption, and the configuration candidates (2) and (3) are not preferred.

(1) The steering torque Ts inputted to the servo controller 55 is multiplied by the gain.
(2) The fundamental assist torque Tb outputted from the servo controller 55 is multiplied by the gain.
(3) The correction torque Tc is added to the basic assist torque Tb.

Figure 11:
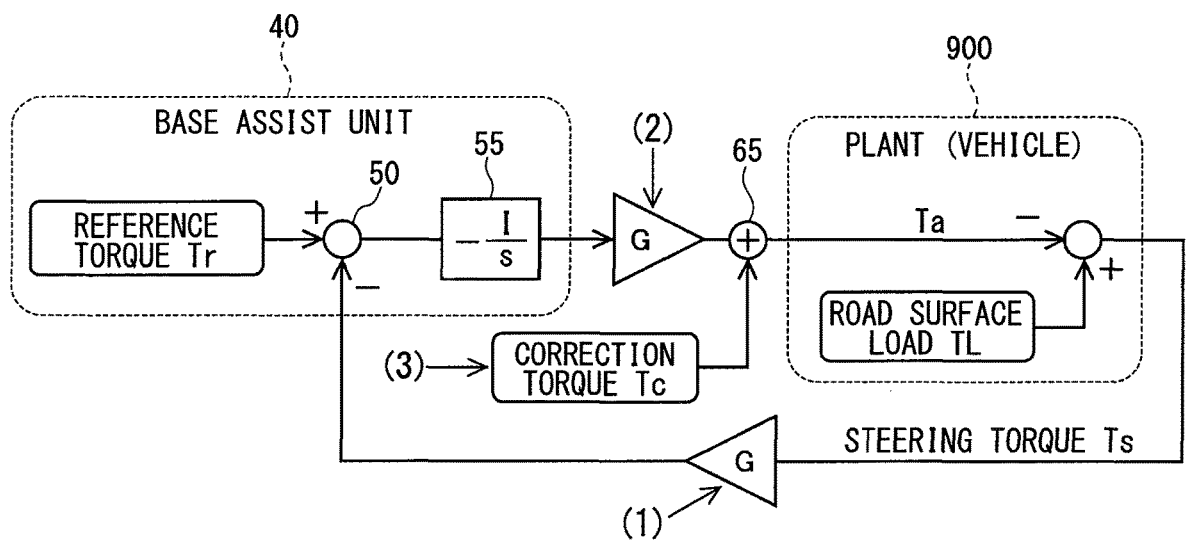
FIG. 11 is a further simplified block diagram of the base assist unit of FIG. 10.

A simplified model, which results from further simplification of the configuration of FIG. 10 is shown in FIG. 11. In this simplified model, a reference steering torque Tr corresponding to the target steering torque Ts* among the inputs of the servo controller 55 in the base assist unit 40 is set as a constant. The servo controller 55 is approximated to an integrator. It is assumed that the road surface load TL in the plant 900 is a constant and an equilibrium equation Ts=TL−Ta holds. The steering torque Ts which is a difference acquired by subtracting the assist torque Ta from the road surface load TL is fed back to the reference steering torque Tr.

Figure 12A:
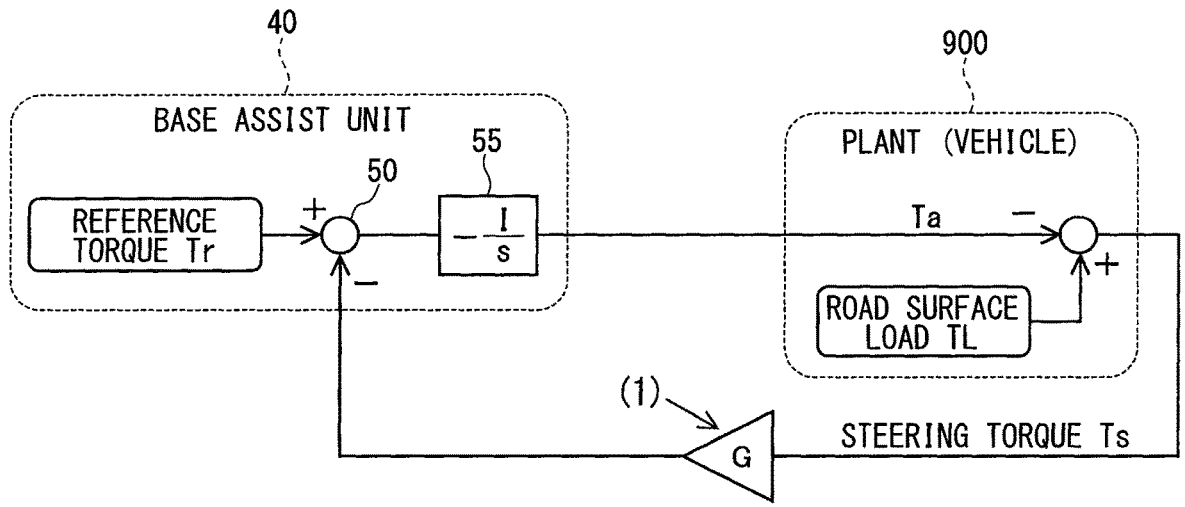
FIG. 12A, FIG. 12B and FIG. 12C are simplified model diagrams for studying input-output characteristics according to controls of three structural candidates.
Figure 12B:
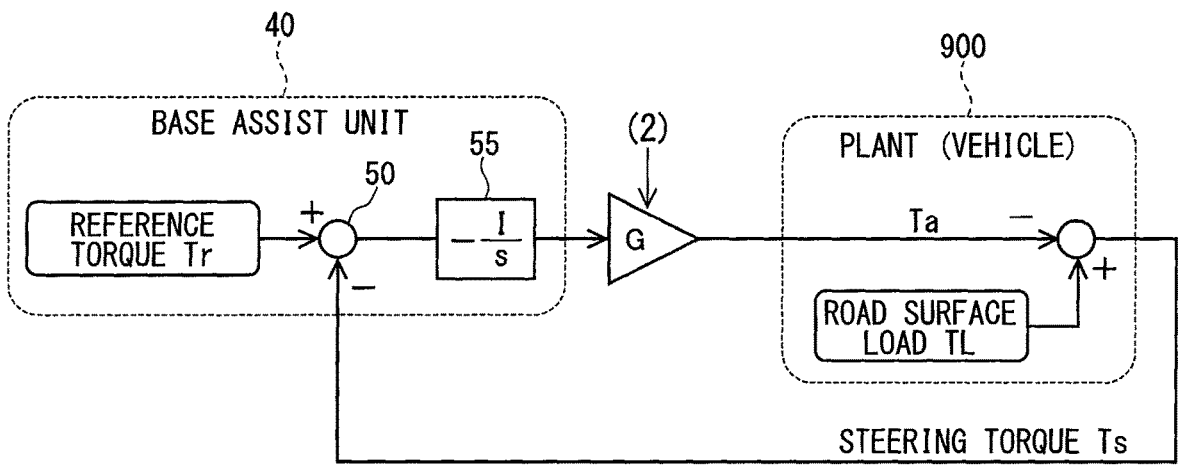
Figure 12C:
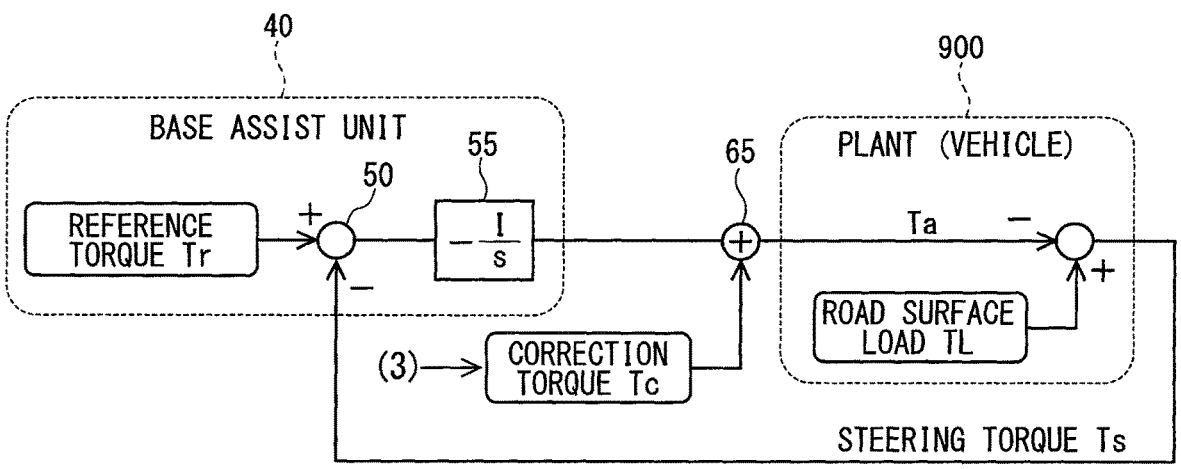

Three configuration candidates (1), (2) and (3) shown in FIG. 11 are assumed to be adopted separately from each other as shown in FIG. 12A, FIG. 12B and FIG. 12C, respectively. An input-output characteristic of each configuration candidate will be described below. In the following equations, symbol G of the gain and symbol Y of a step response are independent among the models.

<Configuration Candidate (1)>

In the configuration candidate (1) shown in FIG. 12A, the steering torque Ts, which is the input to the servo controller 55, is multiplied by the gain G. This model is expressed by the following equation [Eq. 4] when organized for Ts.

$$Ta = -I(Tr-GTs)/s, \quad TL-Ta=Ts, \quad G \neq 0$$

$$Ts = [I/(s+GI)]Tr + [s/(s+GI)]TL \quad [\text{Eq. 4}]$$

A convergence value of Ts is derived by calculating a step response Y of Ts. The step response Y of Ts is expressed by the following equation [Eq. 5].

$$\begin{aligned}Y &= \{[I/(s+GI)]Tr + [s/(s+GI)]TL\}(1/s) \\ &= (1/G)(Tr/s) - Tr/(s+GI) + TL/(s+GI)\end{aligned} \quad [\text{Eq. 5}]$$

The inverse Laplace transform of the equation [Eq. 5] is expressed by the following equation [Eq. 6].

$$Y = (1/G)Tr - (Tr)e^{-GIt} + (TL)e^{-GIt} \quad [\text{Eq. 6}]$$

The convergence value of Ts is derived by the following equation [Eq. 7].

$$Y = (1/G)Tr, \text{ that is, } Ts = (1/G)Tr \quad [\text{Eq. 7}]$$

This is because $-(Tr)e^{-GIt}$ and $(TL)e^{-GIt}$ decrease to 0 when t is increased to ∞.

For this reason, in the configuration candidate (1), the steering torque Ts increases with the reciprocal multiple (1/G) of the gain G by setting the gain G to the range 0<G≤1. That is, by decreasing the gain G multiplied by the steering torque Ts, which is the input to the servo controller 55, from 1 at the time of end hitting, it is possible to suitably increase the viscous load to be applied to the driver.

<Configuration Candidate (2)>

In the configuration candidate (2) shown in FIG. 12B, the basic steering torque Tb, which is outputted from the servo controller 55, is multiplied by the gain G. This model is expressed by the following equation [Eq. 8] when organized for Ts.

$$Ta = -(GI/s)(Tr-Ts), \quad TL-Ta=Ts, \quad G \neq 0$$

$$Ts = [GI/(s+GI)]Tr + [s/(s+GI)]TL \quad [\text{Eq. 8}]$$

A convergence value of Ts is derived by calculating a step response Y of Ts. The step response Y of Ts is expressed by the following equation [Eq. 9].

$$Y = \{[GI/(s+GI)]Tr + [s/(s+GI)]TL\}(1/s) \quad [\text{Eq. 9}]$$
$$= Tr/s - Tr/(s+GI) + TL/(s+GI)$$

The inverse Laplace transform of the equation [Eq. 9] is expressed by the following equation [Eq. 10].

$$Y = Tr - (Tr)e^{-GIt} + (TL)e^{-GIt} \quad [\text{Eq. 10}]$$

The convergence value of Ts is derived by the following equation [Eq. 11].

$$Y = Tr, \text{ that is, } Ts = Tr \quad [\text{Eq. 11}]$$

This is because $-(Tr)e^{-GIt}$ and $(TL)e^{-GIt}$ decrease to 0 when t is increased to ∞.

Therefore, no matter what value the gain G is set in the configuration candidate (2), the steering torque Ts converges to the reference steering torque Tr. Therefore, even if there is a transient change, the static steering torque Ts does not change. That is, in case of a controller having a low input frequency and high responsiveness, the effect of increasing the steering torque Ts by the configuration that multiplies the basic assist torque Tb by the gain G is small.

<Configuration Candidate (3)>

In the configuration candidate (3), as shown in FIG. 12C, a correction torque Tc for suppressing the assist torque is added to the basic assist torque Tb. The correction torque Tc corresponds to the damping torque Td described with reference to FIG. 2 and FIG. 3. This model is expressed by the following equation [Eq. 12] when organized for Ts.

$$Ta = -(I/s)(Tr - Ts), \ TL - Ta + Tc = Ts, \ G \neq 0$$

$$Ts = [I/(s+I)]Tr + [s/(s+I)](TL + Tc) \quad [\text{Eq. 12}]$$

A convergence value of Ts is derived by calculating a step response Y of Ts. The step response Y of Ts is expressed by the following equation [Eq. 13].

$$Y = \{[GI/(s+GI)]Tr + [s/(s+GI)](TL+Tc)\}/(1/s) \quad [\text{Eq. 13}]$$
$$= Tr/s - Tr/(s+GI) + (TL+Tc)/(s+GI)$$

The inverse Laplace transform of the equation [13] is expressed by the following equation [Eq. 14].

$$Y = Tr - (Tr)e^{-It} + (TL+Tc)e^{-It} \quad [\text{Eq. 14}]$$

The convergence value of Ts is derived by the following equation [Eq. 15].

$$Y = Tr, \text{ that is, } Ts = Tr \quad [\text{Eq. 15}]$$

This is because $-(Tr)e^{-It}$ and $(TL-Tc)e^{-It}$ decrease to 0 when t is increased to ∞.

Therefore, no matter what value the correction torque Tc is set in the configuration candidate (3), the steering torque Ts converges to the reference steering torque Tr. Therefore, even if there is a transient change, the static steering torque Ts does not change. That is, in case of a controller having a low input frequency and high responsiveness, the effect of increasing the steering torque Ts by the configuration that multiplies the basic assist torque Tb by the gain G is small.

As described above, it is only the configuration candidate (1) that can provide the effect of increasing the convergence value of the steering torque Ts among the three configuration candidates (1), (2) and (3). Therefore, it is possible in the present embodiment to generate the viscous load stably at the time of end hitting by adopting the configuration candidate (1) and multiplying the steering torque Ts, which is the input to the servo controller 55, by the gain K of 1 or smaller than 1 as shown in FIG. 8.

Other Embodiment (A) In the above-described embodiment, the damping control unit 60 is provided in the assist control unit 15 for comparison of the effects with the related art. However, in the present embodiment, the assist control unit 15 may not be provided with the damping control unit 60.

(B) The steering torque correction unit 20 may be configured to decrease the detection value of the steering torque Ts not only at the time of end hitting but also at the time of request for the application of the viscous load to the driver by reducing the assist torque Ta. Also, it is not necessary to check whether it is in the turn-in state or the turn-back state.

(C) The target steering torque calculation unit 49 of the base assist unit 40 is not limited to the configuration in which the four target steering torques Tbase, Tstiff, Tvisc and Tiner are summed as in the present embodiment. The target steering torque calculation unit 49 may alternatively be configured to calculate the target steering torque Ts* based on at least the steering torque Ts with or without the steering angular velocity ω.

(D) The servo controller 55 of the base assist unit 40 may be any servo controller as long as it calculates the basic assist torque Tb so as to cause the corrected steering torque Tcmp to follow the target steering torque Ts*. Its specific configuration is not limited to that of the present embodiment.

The steering control device is not limited to the embodiment described above and may be implemented with various modifications.

What is claimed is:

1. A non-transitory computer readable medium storing a computer program product comprising instructions for controlling an assist torque which is generated by a steering assist motor in accordance with a steering torque of a driver, the instructions configured to, when executed by a processor, cause the processor to:
    generate a basic assist torque which is a basic amount of assist torque;
    generate a corrected steering torque which is corrected to decrease so that an absolute value of the corrected steering torque becomes smaller than an absolute value of a steering torque detection value, when a viscous load is required to be applied to the driver by decreasing the assist torques;
    calculate a target steering torque based on the steering torque; and
    calculate the basic assist torque to cause the corrected steering torque to follow the target steering torque.

2. The non-transitory computer readable medium according to claim 1, wherein the instructions are configured to, when executed by the processor, further cause the processor to:
    decrease the absolute value of the corrected steering torque, when the absolute value of a steering angle approaches an end of a steering wheel movement, which is an upper limit value, and exceeds an angular threshold value.

3. The non-transitory computer readable medium according to claim 2, wherein the instructions are configured to, when executed by the processor, further cause the processor to:
  decrease the absolute value of the corrected steering torque more as the absolute value of the steering angle is closer to the end or an absolute value of a steering angular velocity toward the end is larger.

4. The non-transitory computer readable medium according to claim 2, wherein the instructions are configured to, when executed by the processor, further cause the processor to:
  check whether a steering wheel is in a turn-in state of turning in toward the end or a turn-back state of turning back from the end;
  output the corrected steering torque, which results from decreasing correction of the absolute value of the steering torque detection value in response to a check result indicating the turn-in state; and
  output the steering torque detection value of the steering torque without correction in response to a check result indicating the turn-back state.

5. The non-transitory computer readable medium according to claim 1, wherein the instructions are configured to, when executed by the processor, further cause the processor to:
  calculate the target steering torque based further on a steering angular velocity in addition to the steering torque; and
  calculate the corrected steering torque in accordance with a vehicle speed.

6. A steering control device for controlling an assist torque which is generated by a steering assist motor in accordance with a steering torque of a driver, the steering control device comprising a microcomputer having a memory storing a control program and programmed to:
  generate a basic assist torque which is a basic amount of assist torque; and
  generate a corrected steering torque, which is corrected to decrease so that an absolute value of the corrected steering torque becomes smaller than an absolute value of a steering torque detection value when a viscous load is required to be applied to the driver by decreasing the assist torque,
  wherein the microcomputer is programmed to calculate a target steering torque based on the steering torque, and calculate the basic assist torque to cause the corrected steering torque to follow the target steering torque.

7. The steering control device according to claim 6, wherein the microcomputer is programmed to:
  decrease the absolute value of the corrected steering torque, when the absolute value of a steering angle approaches an end of a steering wheel movement, which is an upper limit value, and exceeds an angular threshold value.

8. The steering control device according to claim 7, wherein the microcomputer is programmed to:
  decrease the absolute value of the corrected steering torque more as the absolute value of the steering angle is closer to the end or an absolute value of a steering angular velocity toward the end is larger.

9. The steering control device according to claim 7, wherein the microcomputer is programmed to:
  check whether a steering wheel is in a turn-in state of turning in toward the end or a turn-back state of turning back from the end;
  output the corrected steering torque, which results from decreasing correction of the absolute value of the steering torque detection value in response to a check result indicating the turn-in state; and
  output the steering torque detection value of the steering torque without correction in response to a check result indicating the turn-back state.

10. The steering control device according to claim 6, wherein the microcomputer is programmed to:
  calculate the target steering torque based further on a steering angular velocity in addition to the steering torque; and
  calculate the corrected steering torque in accordance with a vehicle speed.

* * * * *